US012641001B2

(12) United States Patent
Liu et al.

(10) Patent No.: US 12,641,001 B2
(45) Date of Patent: May 26, 2026

(54) DATA TRANSMISSION CONTROL METHOD AND APPARATUS, ELECTRONIC DEVICE, AND STORAGE MEDIUM

(71) Applicant: BEIJING HUIJUN TECHNOLOGY CO., LTD., Beijing (CN)

(72) Inventors: Zelin Liu, Beijing (CN); Yugang Ke, Beijing (CN)

(73) Assignee: BEIJING HUIJUN TECHNOLOGY CO., LTD., Beijing (CN)

( * ) Notice: Subject to any disclaimer, the term of this patent is extended or adjusted under 35 U.S.C. 154(b) by 409 days.

(21) Appl. No.: 18/266,715

(22) PCT Filed: Apr. 11, 2022

(86) PCT No.: PCT/CN2022/086186
§ 371 (c)(1),
(2) Date: Jun. 12, 2023

(87) PCT Pub. No.: WO2022/228103
PCT Pub. Date: Nov. 3, 2022

(65) Prior Publication Data
US 2024/0056370 A1 Feb. 15, 2024

(30) Foreign Application Priority Data

Apr. 30, 2021 (CN) .......................... 202110483763.6

(51) Int. Cl.
*H04L 43/0829* (2022.01)
*H04L 1/1607* (2023.01)
(Continued)

(52) U.S. Cl.
CPC ........ *H04L 43/0829* (2013.01); *H04L 1/1607* (2013.01); *H04L 1/1829* (2013.01);
(Continued)

(58) Field of Classification Search
CPC . H04L 43/0829; H04L 1/1607; H04L 1/1829; H04L 1/1848; H04L 1/1864;
(Continued)

(56) References Cited

U.S. PATENT DOCUMENTS

2008/0263105 A1* 10/2008 Nakamura .......... H04L 43/0817
2011/0103377 A1 5/2011 Hua et al.
(Continued)

FOREIGN PATENT DOCUMENTS

CN 105634836 A 6/2016
CN 109035808 A * 12/2018 ............... G08G 1/08
(Continued)

OTHER PUBLICATIONS

Zhao, "A Traffic Switching Method And System Based On Deep Learning", CN 109035808 A, Dec. 18, 2018, 11 Pages. (Year: 2018).*

(Continued)

*Primary Examiner* — Brian J. Gillis
*Assistant Examiner* — Chhian (Amy) Ling
(74) *Attorney, Agent, or Firm* — Bridgeway IP Law Group, PLLC; Jihun Kim

(57) ABSTRACT

Provided are a data transmission control method and apparatus, an electronic device, and a storage medium. The data transmission control method can be applied to a first device which receives a data packet transmitted by a second device. The method includes: receiving a first data packet transmitted by the second device, and determining first time information corresponding to the first data packet; determining a network jitter degree value based on the first time information and second time information, in which the second time information is time information corresponding to a second data packet, and the second data packet is a data packet transmitted to the first device by the second device before (Continued)

transmitting the first data packet; and determining a retransmission timestamp based on the network jitter degree value, and sending the retransmission timestamp to the second device.

15 Claims, 8 Drawing Sheets

(51) Int. Cl.

| | | |
|---|---|---|
| *H04L 1/1829* | (2023.01) | |
| *H04L 1/1867* | (2023.01) | |
| *H04L 43/087* | (2022.01) | |
| *H04L 43/106* | (2022.01) | |
| *H04L 41/16* | (2022.01) | |

(52) U.S. Cl.
CPC .......... *H04L 1/1848* (2013.01); *H04L 1/1864* (2013.01); *H04L 1/1867* (2013.01); *H04L 1/1896* (2013.01); *H04L 43/087* (2013.01); *H04L 43/106* (2013.01); *H04L 41/16* (2013.01)

(58) Field of Classification Search
CPC ... H04L 1/1867; H04L 1/1896; H04L 43/087; H04L 43/106; H04L 41/16
See application file for complete search history.

(56) References Cited

U.S. PATENT DOCUMENTS

| | | | | |
|---|---|---|---|---|
| 2017/0093677 A1* | 3/2017 | Skerry | .................... | H04L 43/20 |
| 2017/0346601 A1 | 11/2017 | Lee et al. | | |

| | | | | |
|---|---|---|---|---|
| 2020/0028631 A1* | 1/2020 | Hasegawa | ............. | H04L 1/1685 |
| 2020/0067840 A1* | 2/2020 | Huang | .................... | H04L 47/56 |
| 2021/0144663 A1* | 5/2021 | Liu | ....................... | H04W 56/009 |
| 2021/0194818 A1* | 6/2021 | So | ......................... | H04L 47/283 |
| 2021/0211368 A1* | 7/2021 | Zheng | ................. | H04L 43/0858 |

FOREIGN PATENT DOCUMENTS

| | | |
|---|---|---|
| CN | 109889543 A | 6/2019 |
| CN | 110417669 A | 11/2019 |
| CN | 111698176 A | 9/2020 |
| CN | 112436924 A | 3/2021 |
| CN | 112637016 A | 4/2021 |
| CN | 112713967 A | 4/2021 |
| CN | 113242113 A | 8/2021 |
| JP | 2008141633 A | 6/2008 |
| JP | 2009278391 A | 11/2009 |
| JP | 2014230160 A | 12/2014 |
| WO | 2019078682 A1 | 4/2019 |

OTHER PUBLICATIONS

Li Xiaoli, "Office Action for CN application 202110483763.6", May 11, 2022, CNIPA, China.
Hideki Tanaka et al., "Office Action for JP application 2023-537670", Jul. 30, 2024, JPO, Japan.
Yu Yang, "Office Action for SG application 11202304541P," Oct. 9, 2025, IPOS, Singapore.

* cited by examiner

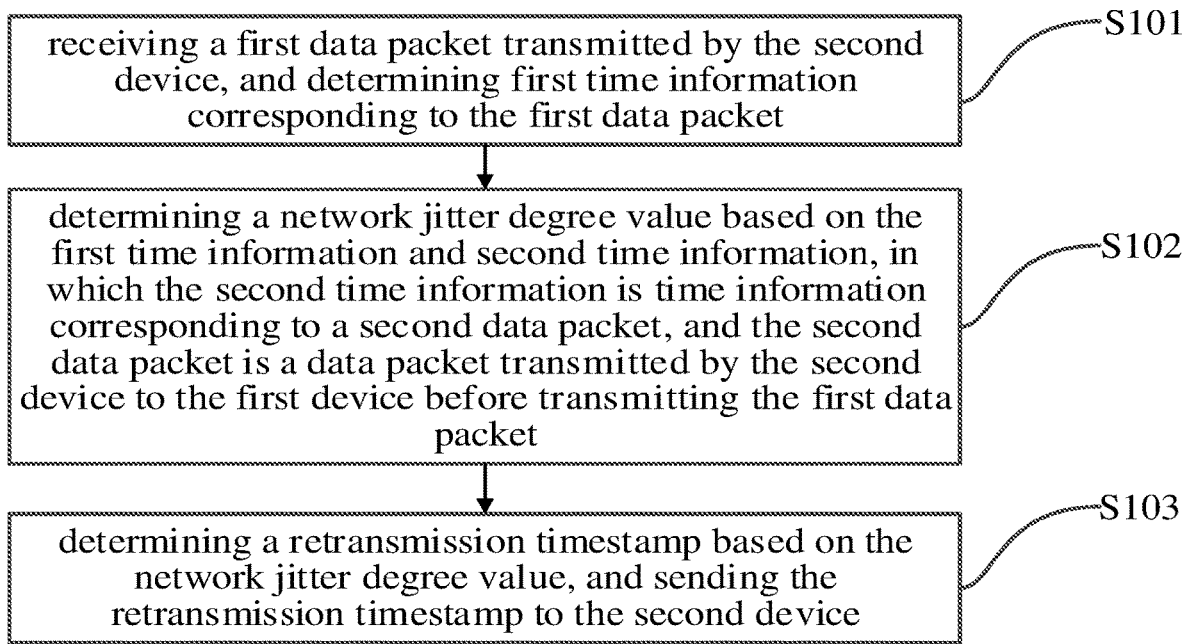

receiving a first data packet transmitted by the second device, and determining first time information corresponding to the first data packet ⟋S101 determining a network jitter degree value based on the first time information and second time information, in which the second time information is time information corresponding to a second data packet, and the second data packet is a data packet transmitted by the second device to the first device before transmitting the first data packet ⟋S102 determining a retransmission timestamp based on the network jitter degree value, and sending the retransmission timestamp to the second device ⟋S103

FIG. 1

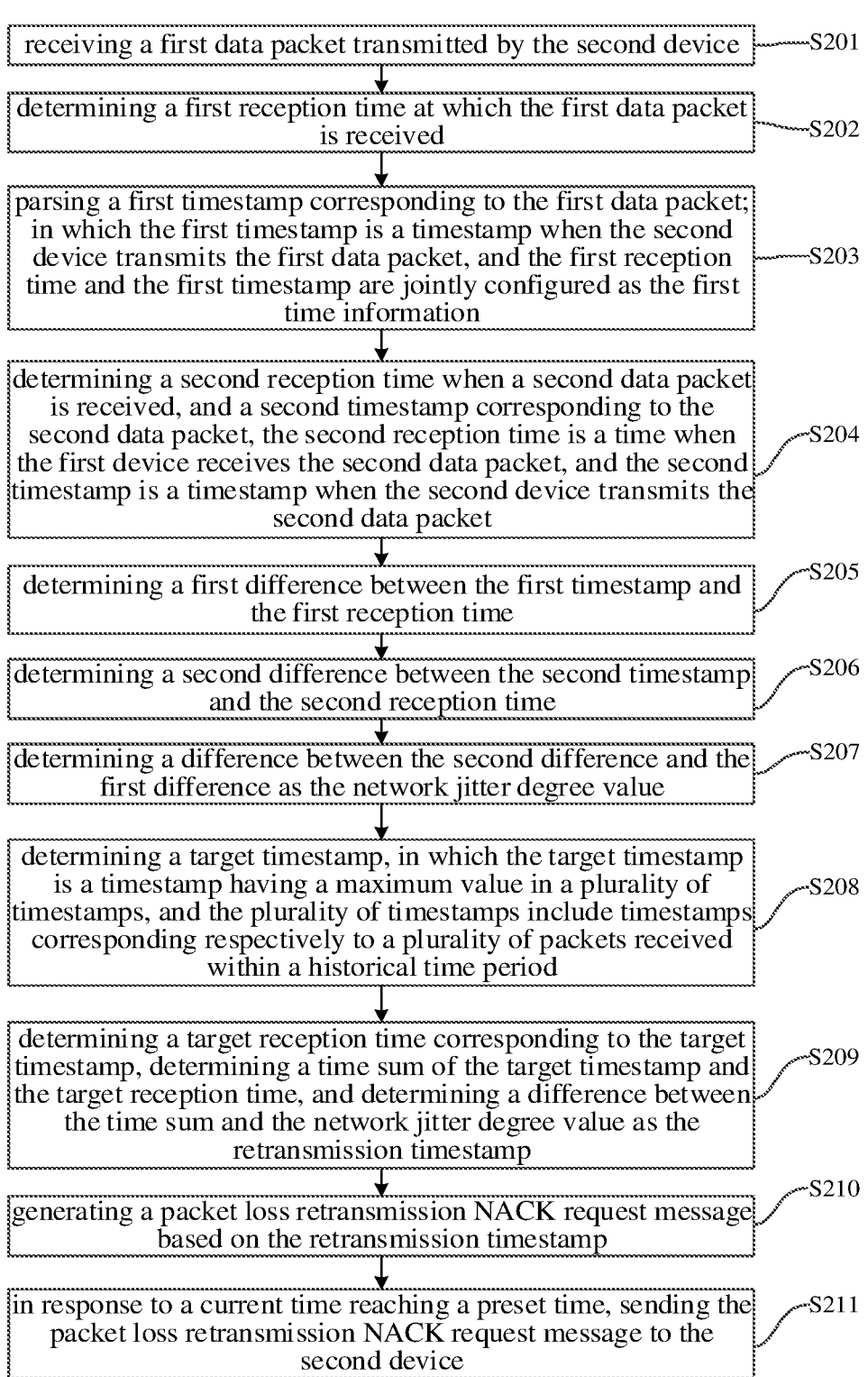

receiving a first data packet transmitted by the second device ——S201 determining a first reception time at which the first data packet is received ——S202 parsing a first timestamp corresponding to the first data packet; in which the first timestamp is a timestamp when the second device transmits the first data packet, and the first reception time and the first timestamp are jointly configured as the first time information ——S203 determining a second reception time when a second data packet is received, and a second timestamp corresponding to the second data packet, the second reception time is a time when the first device receives the second data packet, and the second timestamp is a timestamp when the second device transmits the second data packet ——S204 determining a first difference between the first timestamp and the first reception time ——S205 determining a second difference between the second timestamp and the second reception time ——S206 determining a difference between the second difference and the first difference as the network jitter degree value ——S207 determining a target timestamp, in which the target timestamp is a timestamp having a maximum value in a plurality of timestamps, and the plurality of timestamps include timestamps corresponding respectively to a plurality of packets received within a historical time period ——S208 determining a target reception time corresponding to the target timestamp, determining a time sum of the target timestamp and the target reception time, and determining a difference between the time sum and the network jitter degree value as the retransmission timestamp ——S209 generating a packet loss retransmission NACK request message based on the retransmission timestamp ——S210 in response to a current time reaching a preset time, sending the packet loss retransmission NACK request message to the second device ——S211

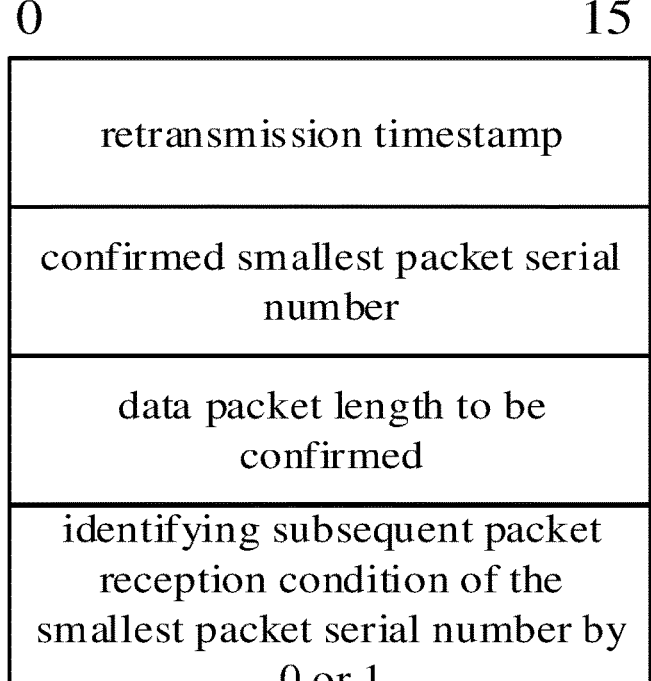

| retransmission timestamp |
| confirmed smallest packet serial number |
| data packet length to be confirmed |
| identifying subsequent packet reception condition of the smallest packet serial number by 0 or 1 |

FIG. 3

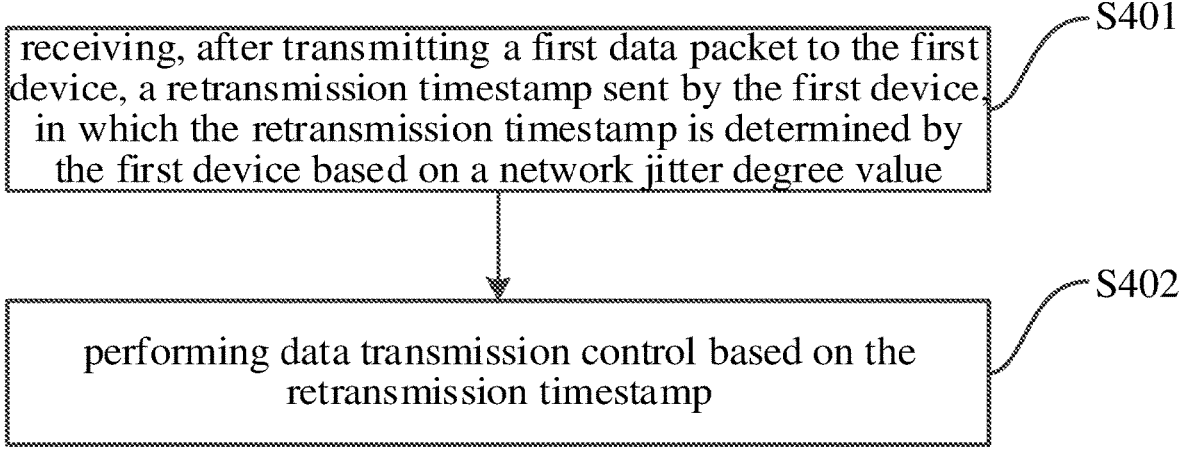

receiving, after transmitting a first data packet to the first device, a retransmission timestamp sent by the first device, in which the retransmission timestamp is determined by the first device based on a network jitter degree value ⟍ S401 performing data transmission control based on the retransmission timestamp ⟍ S402

FIG. 4

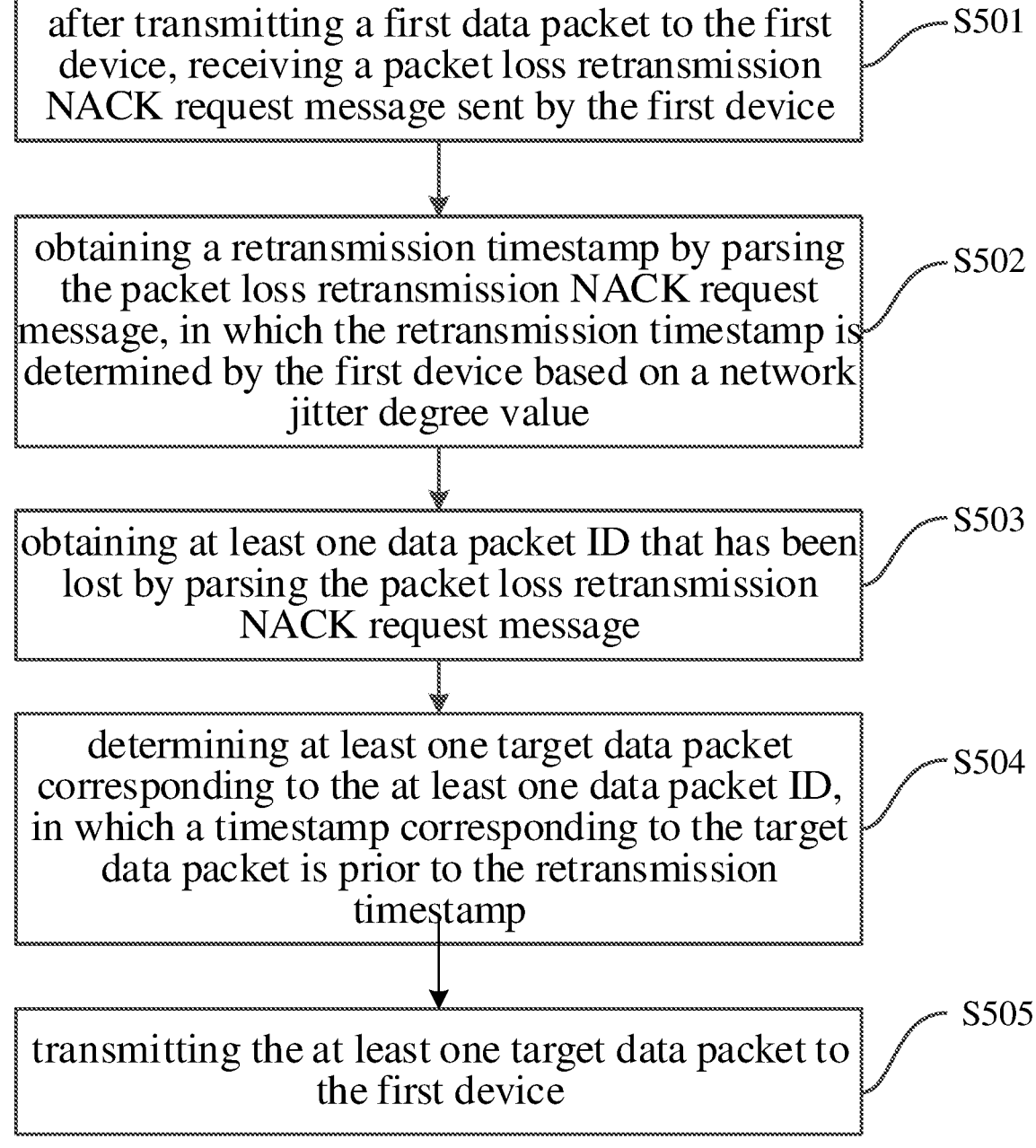

after transmitting a first data packet to the first device, receiving a packet loss retransmission NACK request message sent by the first device — S501 obtaining a retransmission timestamp by parsing the packet loss retransmission NACK request message, in which the retransmission timestamp is determined by the first device based on a network jitter degree value — S502 obtaining at least one data packet ID that has been lost by parsing the packet loss retransmission NACK request message — S503 determining at least one target data packet corresponding to the at least one data packet ID, in which a timestamp corresponding to the target data packet is prior to the retransmission timestamp — S504 transmitting the at least one target data packet to the first device — S505

FIG. 5

DATA TRANSMISSION CONTROL METHOD AND APPARATUS, ELECTRONIC DEVICE, AND STORAGE MEDIUM

CROSS REFERENCE TO RELATED APPLICATIONS

This application is based on and claims priority to Chinese patent application No. 202110483763.6, filed on Apr. 30, 2021, the entire contents of which are incorporated herein by reference.

TECHNICAL FIELD

The disclosure relates to a field of communication technology, in particular to a data transmission control method, a data transmission control apparatus, an electronic device and a storage medium.

BACKGROUND

With the rapid development of communication technology, all kinds of network applications require data transmission. However, Internet communication networks are not always reliable, and data packets may be lost during data transmission due to network instabilities.

In the related art, after receiving the data packet, an electronic device that receives the data packet usually sends a data packet Negative Acknowledgement (NACK) request to an electronic device that sends the data packet to determine whether the data packet is lost based on the NACK request, and if the data packet is lost, data packet retransmission is triggered.

SUMMARY

According to a first aspect of the disclosure, a data transmission control method, applied to a first device that receives a data packet transmitted by a second device, is provided. The method includes: receiving a first data packet transmitted by the second device, and determining first time information corresponding to the first data packet; determining a network jitter degree value based on the first time information and second time information, in which the second time information is time information corresponding to a second data packet, and the second data packet is a data packet transmitted by the second device to the first device before transmitting the first data packet; and determining a retransmission timestamp based on the network jitter degree value, and sending the retransmission timestamp to the second device.

According to a second aspect of the disclosure, a data transmission control method, applied to a second device that transmits a data packet to a first device, is provided. The method includes: receiving, after transmitting a first data packet to the first device, a retransmission timestamp sent by the first device, in which the retransmission timestamp is determined by the first device based on a network jitter degree value; and performing data transmission control based on the retransmission timestamp.

According to a third aspect of the disclosure, a data transmission control apparatus, applied to a first device that receives a data packet transmitted by a second device, is provided. The apparatus includes: a first receiving module, a first determining module, and a second determining module. The first receiving module is configured to receive a first data packet transmitted by the second device, and determine first time information corresponding to the first data packet. The first determining module is configured to determine a network jitter degree value based on the first time information and second time information, in which the second time information is time information corresponding to a second data packet, and the second data packet is a data packet transmitted by the second device to the first device before transmitting the first data packet. The second determining module is configured to determine a retransmission timestamp based on the network jitter degree value, and send the retransmission timestamp to the second device.

According to a fourth aspect of the disclosure, a data transmission control apparatus, applied to a second device that transmits a data packet to a first device, is provided. The apparatus includes: a second receiving module and a controlling module. The second receiving module is configured to receive, after transmitting a first data packet to the first device, a retransmission timestamp sent by the first device, in which the retransmission timestamp is determined by the first device based on a network jitter degree value. The controlling module is configured to perform data transmission control based on the retransmission timestamp.

According to a fifth aspect of the disclosure, an electronic device is provided. The electronic device includes: at least one processor, and a memory communicatively coupled to the at least one processor. The memory stores instructions executable by the at least one processor. When the instructions are executed by the at least one processor, the at least one processor is caused to implement the data transmission control method according to the first aspect of the disclosure, or the data transmission control method according to the second aspect of the disclosure.

According to a sixth aspect of the disclosure, a non-transitory computer readable storage medium having computer instructions stored thereon is provided. The computer instructions are used to cause a computer to implement the data transmission control method according to the first aspect of the disclosure, or the data transmission control method according to the second aspect of the disclosure.

According to a seventh aspect of the disclosure, a computer program product including computer programs is provided. When the computer programs are executed by a processor, the data transmission control method according to the first aspect of the disclosure, or the data transmission control method according to the second aspect of the disclosure is implemented.

According to an eighth aspect of the disclosure, a computer program including computer program codes is provided. When the computer program codes are running on a computer, the computer is caused to implement the data transmission control method according to the first aspect of the disclosure, or the data transmission control method according to the second aspect of the disclosure.

It should be understood that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The foregoing and/or additional aspects and advantages of the disclosure will become apparent and readily understood from the following description of the embodiments in combination with the accompanying drawings, in which:

FIG. 1 is a flowchart of a data transmission control method according to an embodiment of the disclosure.

FIG. 2 is a flowchart of a data transmission control method according to another embodiment of the disclosure.

FIG. 3 is a schematic diagram of a packet loss retransmission NACK request message according to an embodiment of the disclosure.

FIG. 4 is a flowchart of a data transmission control method according to a further embodiment of the disclosure.

FIG. 5 is a flowchart of a data transmission control method according to further another embodiment of the disclosure.

DETAILED DESCRIPTION

Figure 6:
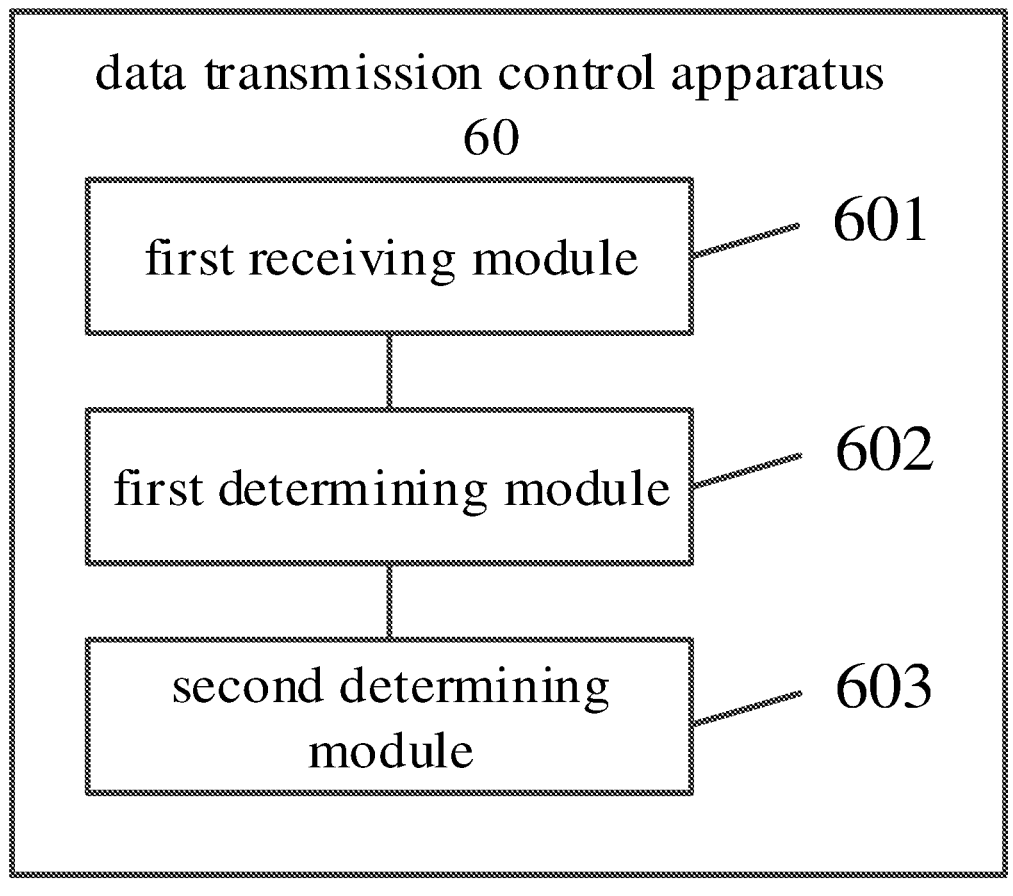
FIG. 6 is a block diagram of a data transmission control apparatus according to an embodiment of the disclosure.

Embodiments of the disclosure are described in detail below, and examples of the embodiments are shown in the accompanying drawings, in which the same or similar numbers indicate the same or similar components or components having the same or similar functions. The embodiments described below with reference to the accompanying drawings are exemplary, and are intended to be used to explain the disclosure and are not to be construed as limiting the disclosure. Instead, the embodiments of the disclosure include all variations, modifications, and equivalents that fall within the spirit and the scope of content of the appended claims.

In the related art, a data transmission process may be affected by network jitter, which influences a retransmission control efficiency of a data packet, thereby affecting a communication stability between devices and a communication quality.

Therefore, the embodiments of the disclosure provide a data transmission control method, a data transmission control apparatus, an electronic device, a computer readable storage medium, a computer program product and a computer program, which can avoid the influence of network jitter, effectively improve the retransmission control efficiency and a retransmission control effect of the data packet, thereby effectively improving the communication stability and the communication quality between devices.

The data transmission control method will be described below in combination with specific embodiments.

FIG. 1 is a flowchart of a data transmission control method according to an embodiment of the disclosure.

It is noted that an execution subject of the data transmission control method of the embodiment is a data transmission control apparatus. The apparatus may be implemented by means of software and/or hardware, which may be configured in an electronic device. The electronic device may include, but is not limited to, a terminal and a server.

The data transmission control method in the embodiment can be applied to a first device. The first device receives a data packet transmitted by a second device, that is, the first device can be an electronic device that receives the data packet transmitted by the second device. Correspondingly, the second device can be an electronic device that transmits the data packet to the first device, which is not limited herein.

As shown in FIG. 1, the data transmission control method includes the following steps.

At step S101, a first data packet transmitted by the second device is received, and first time information corresponding to the first data packet is determined.

The data packet may refer to chunked network data. For example, the second device may transmits the data packet for communication to the first device via a communication network, which may be a wide area network, or a local area network, which is not limited herein.

The data packet currently transmitted by the second device and received by the first device may be referred to as the first data packet. The first data packet has certain associated time information, and the associated time information may be referred to as the first time information. The first time information may be a time when the first device receives the first data packet, or a time when the second device sends the first data packet, which is not limited herein.

The first time information corresponding to the first data packet can be determined in real time when receiving the first data packet transmitted by the second device, and the first time information can be used to determine a network jitter degree of the communication network.

In some embodiments, determining the first time information corresponding to the first data packet may include: determining a first reception time at which the first data packet is received and parsing a first timestamp corresponding to the first data packet, in which the first timestamp is a timestamp when the second device transmits the first data packet, and the first reception time and the first timestamp are jointly configured as the first time information. Therefore, it is possible to quickly determine the time information associated with the first data packet. Further, by using the first reception time and the first timestamp as the aforementioned associated time information and using the associated time information to calculate the network jitter degree value, it is possible to assist in easily determining the network jitter degree value, which makes the calculated network jitter degree value more referential, thereby effectively assisting in improving the retransmission control effect of the data packet.

That is, in the embodiment, when determining the first time information corresponding to the first data packet, the time at which the first data packet is received by the first device, i.e., the reception time of the first data packet, and the time at which the second device transmits the first data packet (the first timestamp) can be determined, and thus the two pieces of time information associated with the first data packet can be obtained, and the two pieces of time information associated with the first data packet is configured as the time information corresponding to the first data packet.

Certainly, it is also possible to use any other possible time information associated with the first data packet as the above-mentioned first time information. For example, the first reception time and the first timestamp are subjected to corresponding mathematical operations, and a time value obtained after the operations is used as the first time information, which is not limited herein.

At step S102, a network jitter degree value is determined based on the first time information and second time information, in which the second time information is time information corresponding to a second data packet, and the second data packet is a data packet transmitted by the second device to the first device before transmitting the first data packet.

The second data packet is a data packet transmitted by the second device to the first device before transmitting the first data packet. In other words, a data packet currently transmitted by the second device and received by the first device may be referred to as the first data packet. Correspondingly, the data packet transmitted by the second device and received by the first device prior to the current time may be referred to as the second data packet.

The second data packet will have certain associated time information, which may be referred to as the second time information. The second time information may be, for example, a time when the first device receives the second data packet, or a timestamp when the second device transmits the second data packet, which is not limited herein.

In other words, in the embodiment of the disclosure, the network jitter degree can be determined accordingly based on the first data packet currently transmitted by the second device and received by the first device, and the second data packet transmitted by the second device and received by the first device before the current time.

In the case of network congestion, a delay generated by queuing may affect an end-to-end delay and result in different packet delays transmitted over the same link. Network jitter is used to describe the variation degree of the delay. The network jitter degree value can be a quantitative representation of the jitter degree, the smaller the network jitter degree value, the more stable the communication network quality, and the greater the network jitter degree value, the less stable the communication network quality.

In the embodiment of the disclosure, the network jitter degree value can be determined based on the first time information corresponding to the first data packet, and the second time information corresponding to the second data packet, in combination with certain algorithmic logic, thereby conveniently and accurately determining the network jitter degree value.

For example, when determining the network jitter degree value based on the first time information corresponding to the first data packet and the second time information corresponding to the second data packet, a pre-trained jitter detection model can be used to determine the network jitter degree value. For example, the first time information corresponding to the first data packet and the second time information corresponding to the second data packet can be input to the pre-trained jitter detection model, to obtain the network jitter degree value output by the pre-trained jitter detection model. Alternatively, any other possible way can be used to determine the network jitter degree value based on the first time information and the second time information, which is not limited herein.

In the embodiment of the disclosure, the first reception time and the first timestamp are jointly used as the first time information. The second time information corresponding to the second data packet can be determined. The second time information may include a second reception time and a second timestamp. The second reception time is a time when the first device receives the second data packet, and the second timestamp is a timestamp when the second device transmits the second data packet. Determining the network jitter degree value based on the first time information and the second time information may include determining the network jitter degree value based on the first reception time, the first timestamp, the second reception time, and the second timestamp. Therefore, a quantitative calculation can be performed on the network jitter degree at the current time more accurately, which effectively improves the reference value of the network jitter degree in retransmission control of the data packet.

That is, in the embodiment of the disclosure, reference to the first reception time, the first timestamp, the second reception time, and the second timestamp may be supported to determine the network jitter degree at the current time. Since during data communication, interrelationships between the reception times and the timestamps of different data packets may have a certain correlation with the network jitter degree of the communication network. For example, the greater the network jitter degree, the greater the impact on the interrelationships between the reception times and the timestamps of different data packets, and the less the network jitter degree, the less the impact on the interrelationships between the reception times and the timestamps of different data packets.

In the embodiment of the disclosure, reference to the first reception time, the first timestamp, the second reception time, and the second timestamp may be supported to assist in determining the network jitter degree value. For example, the network jitter degree value is obtained based on the first reception time, the first timestamp, the second reception time, and the second timestamp in combination with certain arithmetic processing, which is not limited herein.

At step S103, a retransmission timestamp is determined based on the network jitter degree value, and the retransmission timestamp is sent to the second device.

After determining the network jitter degree value based on the first time information and the second time information as described above, the retransmission timestamp may be determined based on the network jitter degree value, and the retransmission timestamp may be sent to the second device, to cause the second device to perform data transmission control with reference to the retransmission timestamp.

In the embodiment, the first data packet transmitted by the second device is received, the first time information corresponding to the first data packet is determined, and the network jitter degree value is determined based on the first time information and the second time information. The second time information is the time information corresponding to the second data packet, the second data packet is the data packet transmitted by the second device to the first device before transmitting the first data packet. The retransmission timestamp is determined based on the network jitter degree value and the retransmission timestamp is sent to the second device. Since retransmission control of the data packet can be performed with the assistance of the network jitter degree, the influence of network jitter can be avoided, which effectively improves a retransmission control efficiency of the data packet and a retransmission control effect of the data packet, thereby effectively improving a communication stability and a communication quality between devices.

FIG. 2 is a flowchart of a data transmission control method according to another embodiment of the disclosure.

The data transmission control method in the embodiment can be applied to a first device, the first device receives a data packet transmitted by a second device. That is, the first device can be an electronic device that receives the data packet transmitted by the second device. Correspondingly, the second device can be an electronic device that transmits the data packet to the first device, which is not limited herein.

As shown in FIG. 2, the data transmission control method includes the following steps.

At step S201, a first data packet transmitted by the second device is received.

At step S202, a first reception time at which the first data packet is received is determined.

At step S203, a first timestamp corresponding to the first data packet is parsed, in which the first timestamp is a timestamp when the second device transmits the first data packet, and the first reception time and the first timestamp are jointly configured as the first time information.

With regard to descriptions of S201-S203, reference can be made to the above embodiments, which will not be repeated here.

At step S204, a second reception time when the second data packet is received and a second timestamp corresponding to the second data packet are determined, in which the second reception time is a time when the first device receives the second data packet, and the second timestamp is a timestamp when the second device transmits the second data packet.

The data packet transmitted by the second device and received by the first device before the current time may be referred to as the second data packet. The second data packet will have certain associated time information, which may be referred to as the second time information. The second time information may be, for example, a time when the second data packet is received by the first device (the second reception time), or a timestamp when the second device transmits the second data packet (the second timestamp), which is not limited herein.

In some embodiments, when the first device receives the second data packet transmitted by the second device, it can determine the second time information corresponding to the second data packet in real time and record the second time information locally in the first device. When receiving the first data packet and analyzing the network jitter degree based on the first time information corresponding to the first data packet, the first device can directly read the stored second time information from the local storage to determine the network jitter degree based on the first time information in combination with the second time information.

At step S205, a first difference between the first timestamp and the first reception time is determined.

The first timestamp is a timestamp when the second device transmits the first data packet.

That is, the first device, upon receiving the first data packet transmitted by the second device, may determine the first time information corresponding to the first data packet, parse the first time information to obtain the first timestamp and the first reception time, and then determine the difference (which may be referred to as the first difference) between the first timestamp and the first reception time. The first difference may be used to determine the network jitter degree value.

For example, if the first timestamp at which the second device sends the first data packet, i.e., the first timestamp, is t11, and the first reception time when the first device receives the first data packet transmitted by the second device is t12, the difference between t11 and t12 is the first difference.

At step S206, a second difference between the second timestamp and the second reception time is determined.

The second timestamp is a time when the second device transmits the second data packet.

That is, the first device can read the corresponding second timestamp and the second reception time from the local storage after determining the first difference between the first timestamp and the first reception time. Since the second data packet is transmitted by the second device to the first device before the current time, the second timestamp and the second reception time can be stored in advance in the local storage of the first device, to support direct reading.

The difference between the second timestamp and the second reception time determined above may be referred to as the second difference, and the second difference may be used, in combination with the first difference, to determine the network jitter degree value.

For example, if the timestamp at which the second device transmits the second data packet, i.e., the second timestamp, is t21, and the second reception time when the first device receives the second data packet transmitted by the second device is t22, the difference between t21 and t22 is the second difference.

At step S207, a difference between the second difference and the first difference is determined as the network jitter degree value.

After determining the first difference between the first timestamp and the first reception time and the second difference between the second timestamp and the second reception time, the difference between the second difference and the first difference can be determined as the network jitter degree value.

That is, the network jitter degree value is obtained based on the second difference and the first difference in combination with the corresponding mathematical operation logic.

Since the network jitter degree value is determined based on the first difference between the first timestamp and the first reception time, and the second difference between the second timestamp and the second reception time, it is possible to quickly and accurately determine the network jitter degree at the current time, achieve more accurate quantification of the network jitter degree at the current time, there by effectively assisting in improving a retransmission control effect of the data packet, and effectively assisting in improving a communication stability and a communication quality between devices.

At step S208, a target timestamp is determined, in which the target timestamp is a timestamp having a maximum value in a plurality of timestamps, and the plurality of timestamps include timestamps corresponding respectively to a plurality of data packets received within a historical time period.

After determining the network jitter degree value, the timestamp having the maximum value can be selected from the plurality of timestamps corresponding respectively to the plurality of data packets received by the first device within the historical time period and determined as the target timestamp. The retransmission timestamp can be determined based on the network jitter degree value and the target timestamp, and the retransmission timestamp can be used to assist the second device in the retransmission control of the data packet.

At step S209, a target reception time corresponding to the target timestamp is determined, a time sum of the target timestamp and the target reception time is determined, and a difference between the time sum and the network jitter degree value is determined as the retransmission timestamp.

After determining the target timestamp, the target reception time corresponding to the target timestamp may be determined, the time sum of the target timestamp and the target reception time is determined, and the difference between the time sum and the network jitter degree value is determined as the retransmission timestamp.

For example, if the target timestamp, i.e., the reception timestamp having the maximum value within the historical time period, is 10000 ms, the target reception time corresponding to the target timestamp is 50 ms, and the calculated network jitter degree value is 30 ms, the time sum of the target timestamp and the target reception time=10000 ms+50 ms=10050 ms, and the retransmission timestamp=10050 ms-30 ms=10020 ms.

Since the retransmission timestamp is calculated based on the target timestamp, the reception time corresponding to the target timestamp and the network jitter degree value, the retransmission timestamp can be accurately obtained, which can effectively ensure the retransmission control accuracy of the data packet and cause the second device to control data packet transmission with reference to the retransmission timestamp.

At step S210, a packet loss retransmission NACK request message is generated based on the retransmission timestamp.

After the retransmission timestamp is determined based on the difference between the target timestamp and the network jitter degree value, the first device can generate the packet loss retransmission NACK request message based on the retransmission timestamp, so as to trigger the second device to perform the corresponding retransmission control on the data packet based on the packet loss retransmission NACK request message.

After a data transmitter sends a data packet to a data receiver, if the data receiver does not receive the corresponding data packet or the corresponding data packet is lost during data transmission, the data receiver generates a NACK message for requesting the data transmitter to re-send the corresponding data packet. The NACK message can be referred to as the packet loss retransmission NACK request message.

In the embodiment, the first device may send the retransmission timestamp to a NACK generator, and the NACK generator can generate the packet loss retransmission NACK request message based on the retransmission timestamp, and trigger the subsequent processing logic of sending the packet loss retransmission NACK request message to the second device.

As shown in FIG. 3, FIG. 3 is a schematic diagram of a packet loss retransmission NACK request message according to an embodiment of the disclosure.

At step S211, in response to a current time reaching a preset time, the packet loss retransmission NACK request message is sent to the second device.

After the packet loss retransmission NACK request message is generated based on the retransmission timestamp, a timer can be pre-configured and timing control can be performed using this timer, to detect whether the current time reaches the preset time of the timer in real time. If the current time reaches the preset time, the packet loss retransmission NACK request message is sent to the second device.

In the embodiment, the NACK generator can control the sending of the packet loss retransmission NACK request message through the timer. For example, when the first device receives the data packet, it can trigger the timer to start. The preset time can be, for example, 100 ms, and subsequently it can also be configured as Rtt (network delay) time (at least 30 ms), to support sending the packet loss retransmission NACK request message to the second device periodically.

In the embodiment, the first data packet transmitted by the second device is received, the first reception time at which the first data packet is received is determined, and the first timestamp corresponding to the first data packet is parsed. The first timestamp is a timestamp when the second device transmits the first data packet, and the first reception time and the first timestamp are jointly configured as the first time information. The second reception time when the second data packet is received and the second timestamp corresponding to the second data packet are determined. The second reception time is a time when the first device receives the second data packet, and the second timestamp is a timestamp when the second device transmits the second data packet. The first difference between the first timestamp and the first reception time is determined, the second difference between the second timestamp and the second reception time is determined, and the network jitter degree value is obtained based on the second difference and the first difference. The target timestamp is determined. The target timestamp is a timestamp having the maximum value in a plurality of timestamps, and the plurality of timestamps include timestamps corresponding respectively to a plurality of data packets received within the historical time period. The difference between the target timestamp and the network jitter degree value is determined as the retransmission timestamp, and the packet loss retransmission NACK request message is generated based on the retransmission timestamp. If the current time reaches the preset time, the packet loss retransmission NACK request message is sent to the second device. Since the network jitter degree value is determined based on the first difference between the first timestamp and the first reception time, and the second difference between the second timestamp and the second reception time, it is possible to quickly and accurately determine the network jitter degree at the current time, achieve more accurate quantification of the network jitter degree at the current time, thereby effectively assisting in improving a retransmission control effect of the data packet, and effectively assisting in improving a communication stability and a communication quality between devices. The retransmission timestamp is obtained based on the network jitter degree value and the target timestamp, so that the first device can generate the NACK request message based on the retransmission timestamp, thereby assisting in accurate retransmission control of the data packet and improving data transmission control effect.

FIG. 4 is a flowchart of a data transmission control method according to a further embodiment of the disclosure.

The data transmission control method in the embodiment can be applied to a second device that transmits a data packet to a first device. That is, the first device may be an electronic device that receives the data packet transmitted by the second device. Correspondingly, the second device may be an electronic device that transmits the data packet to the first device, which is not limited herein.

As shown in FIG. 4, the data transmission control method includes the following steps.

At step S401, after transmitting a first data packet to the first device, a retransmission timestamp sent by the first device is received, in which the retransmission timestamp is determined by the first device based on a network jitter degree value.

In the embodiment, after transmitting the first data packet to the first device, the second device can monitor in real time whether it receives the retransmission timestamp sent back by the first device, and can trigger subsequent steps if it detects that the retransmission timestamp is received.

At step S402, data transmission control is performed based on the retransmission timestamp.

That is, after receiving the retransmission timestamp sent by the first device, the second device can perform retransmission control of the data packet with reference to the retransmission timestamp.

In the embodiment, the retransmission timestamp sent by the first device is received after transmitting the first data packet to the first device, and the data transmission control is performed based on the retransmission timestamp. Since the retransmission timestamp is determined by the first device based on the network jitter degree value, the influence of network jitter can be avoided, thereby ensuring an accuracy of retransmission control of the data packet.

FIG. 5 is a flowchart of a data transmission control method according to further another embodiment of the disclosure.

The data transmission control method in the embodiment can be applied to a second device that transmits a data packet to a first device. That is, the first device may be an electronic device that receives the data packet transmitted by the second device. Correspondingly, the second device can be an electronic device that transmits the data packet to the first device, which is not limited herein.

As shown in FIG. 5, the data transmission control method includes the following steps.

At step S501, after transmitting a first data packet to the first device, a packet loss retransmission NACK request message sent by the first device is received.

In the embodiment, the second device receives the packet loss retransmission NACK request message from the first device after transmitting the first data packet to the first device.

At step S502, a retransmission timestamp is obtained by parsing the packet loss retransmission NACK request message, and the retransmission timestamp is determined by the first device based on a network jitter degree value.

After transmitting the first data packet to the first device and receiving the packet loss retransmission NACK request message sent by the first device, the packet loss retransmission NACK request message may be parsed to obtain the retransmission timestamp, which is determined by the first device based on the network jitter degree value.

In the embodiment, when the second device receives the packet loss retransmission NACK request message sent by the first device, it can determine that data packet loss has occurred during data transmission, and parse the packet loss retransmission NACK request message generated by the first device, to obtain the retransmission timestamp carried in the NACK request message.

At step S503, at least one data packet ID that has been lost is obtained by parsing the packet loss retransmission NACK request message.

After the packet loss retransmission NACK request message is parsed to obtain the retransmission timestamp, the packet loss retransmission NACK request message can be parsed to obtain at least one data packet ID that has been lost. The data packet ID can be used to uniquely identify the corresponding data packet.

In the embodiment, after receiving the NACK request message sent by the first device, the second device can determine that data packet loss has occurred during data transmission, and parse the packet loss retransmission NACK request message generated by the first device, to obtain one or more data packet IDs that are lost during data transmission. The one or more data packet IDs can be used to assist in determining the corresponding one or more data packets, which is not limited.

At step S504, at least one target data packet corresponding to the at least one data packet ID is determined, in which a timestamp corresponding to the target data packet is prior to the retransmission timestamp.

After parsing the packet loss retransmission NACK request message to obtain the at least one data packet ID that has been lost, the at least one corresponding target data packet can be determined based on the at least one data packet ID. The target data packet can refer to a data packet that has been lost during data transmission, which can trigger subsequent specific retransmission control of the data packet that has been lost.

At step S505, the at least one target data packet is transmitted to the first device.

In the embodiment, after determining the data packet that is lost during data transmission, the second device retransmits the target data packet, i.e., the lost data packet, to the first device, and updates the timestamp corresponding to the target data packet when transmitting the target data packet to the first device.

In the embodiment, the packet loss retransmission NACK request message sent by the first device is received after transmitting the first data packet to the first device. The packet loss retransmission NACK request message is parsed to obtain the retransmission timestamp, and the packet loss retransmission NACK request message is parsed to obtain the at least one data packet ID that has been lost. The at least one target data packet is transmitted to the first device. It is possible to accurately determine the packet loss condition during data transmission, enable a more comprehensive retransmission of the lost data packet, and update the timestamp corresponding to the retransmitted target data packet, thereby supporting re-determining whether packet loss occurs during the retransmission process after the retransmission, which can effectively improve a comprehensiveness and an accuracy of data transmission control.

FIG. 6 is a block diagram of a data transmission control apparatus according to an embodiment of the disclosure.

As shown in FIG. 6, the data transmission control apparatus 60 is applied to a first device that receives a data packet transmitted by a second device. The apparatus 60 includes: a first receiving module 601, a first determining module 602, and a second determining module 603.

The first receiving module 601 is configured to receive a first data packet transmitted by the second device, and determine first time information corresponding to the first data packet.

The first determining module 602 is configured to determine a network jitter degree value based on the first time information and second time information, in which the second time information is time information corresponding to a second data packet, and the second data packet is a data packet transmitted by the second device to the first device before transmitting the first data packet.

The second determining module 603 is configured to determine a retransmission timestamp based on the network jitter degree value, and send the retransmission timestamp to the second device.

In some embodiments of the disclosure, the first receiving module 601 is further configured to:

determine a first reception time at which the first data packet is received; and parse a first timestamp corresponding to the first data packet, in which the first timestamp is a timestamp when the second device transmits the first data packet, and the first reception time and the first timestamp are jointly configured as the first time information.

In some embodiments of the disclosure, the second time information includes: a second reception time and a second timestamp. The second reception time is a time when the first device receives the second data packet, and the second timestamp is a timestamp when the second device transmits the second data packet. The first determining module 602 is configured to:

determine the network jitter degree value based on the first reception time, the first timestamp, the second reception time, and the second timestamp.

In some embodiments of the disclosure, the first determining module 602 is further configured to:

determine a first difference between the first timestamp and the first reception time;

determine a second difference between the second timestamp and the second reception time; and determine a difference between the second difference and the first difference as the network jitter degree value.

Figure 7:
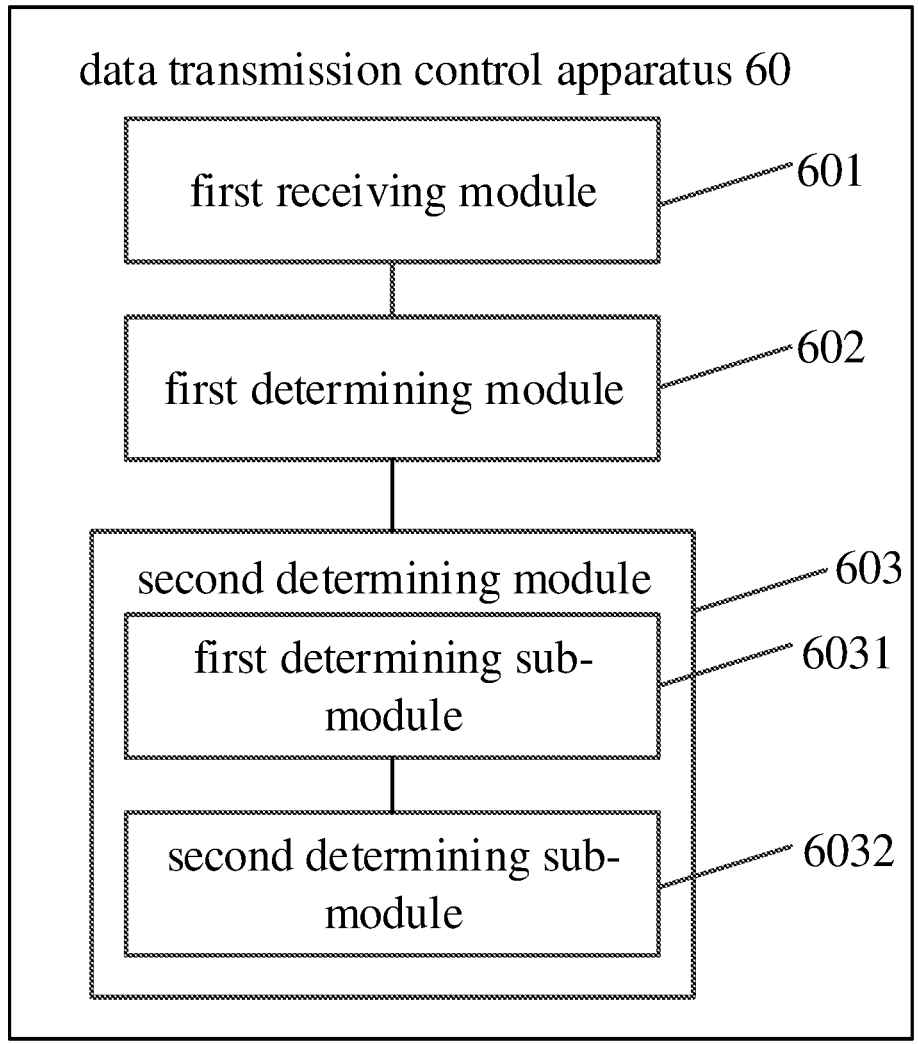
FIG. 7 is a block diagram of a data transmission control apparatus according to another embodiment of the disclosure.

In some embodiments of the disclosure, as shown in FIG. 7, FIG. 7 is a block diagram of a data transmission control apparatus according to another embodiment of the disclosure. The second determining module 603 includes: a first determining sub-module 6031 and a second determining sub-module 6032.

The first determining sub-module 6031 is configured to determine a target timestamp, in which the target timestamp is a timestamp having a maximum value in a plurality of timestamps, and the plurality of timestamps include timestamps corresponding respectively to a plurality of packets received within a historical time period.

The second determining sub-module 6032 is configured to determine a target reception time corresponding to the target timestamp, determine a time sum of the target timestamp and the target reception time, and determine a difference between the time sum and the network jitter degree value as the retransmission timestamp.

In some embodiments of the disclosure, the second determining module 603 is further configured to:

generate a packet loss retransmission NACK request message based on the retransmission timestamp; and in response to a current time reaching a preset time, send the packet loss retransmission NACK request message to the second device.

It should be noted that the foregoing explanation of the data transmission control method is also applicable to the data transmission control apparatus of the embodiment and will not be repeated here.

In the embodiment, the first data packet transmitted by the second device is received, the first time information corresponding to the first data packet is determined, and the network jitter degree value is determined based on the first time information and the second time information. The second time information is the time information corresponding to the second data packet, the second data packet is the data packet transmitted by the second device to the first device before transmitting the first data packet. The retransmission timestamp is determined based on the network jitter degree value, and the retransmission timestamp is sent to the second device. Since retransmission control of the data packet can be performed with the assistance of the network jitter degree, the influence of network jitter can be avoided, which effectively improves a retransmission control efficiency of the data packet and a retransmission control effect of the data packet, thereby effectively improving a communication stability and a communication quality between devices.

Figure 8:
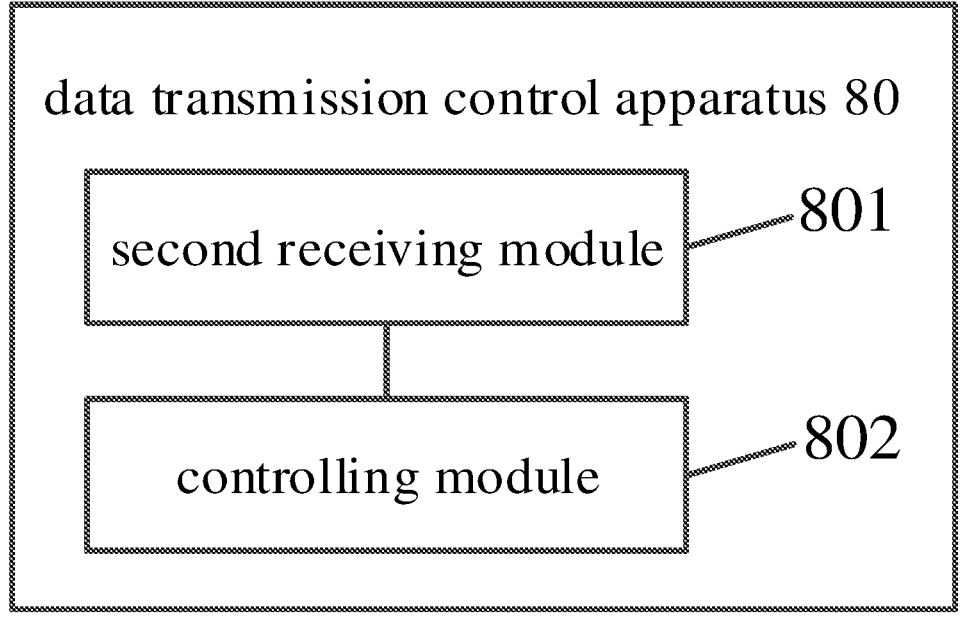
FIG. 8 is a block diagram of a data transmission control apparatus according to a further embodiment of the disclosure.

FIG. 8 is a block diagram of a data transmission control apparatus according to a further embodiment of the disclosure.

As shown in FIG. 8, the data transmission control apparatus 80 is applied to a second device that transmits a data packet to a first device. The apparatus includes: a second receiving module 801 and a controlling module 802.

The second receiving module 801 is configured to receive, after transmitting a first data packet to the first device, a retransmission timestamp sent by the first device, in which the retransmission timestamp is determined by the first device based on a network jitter degree value.

The controlling module 802 is configured to perform data transmission control based on the retransmission timestamp.

In some embodiments of the disclosure, the second receiving module 801 is further configured to:

receive a packet loss retransmission NACK request message sent by the first device; and obtain the retransmission timestamp by parsing the packet loss retransmission NACK request message.

In some embodiments of the disclosure, the controlling module 802 is further configured to:

obtain at least one data packet ID that has been lost by parsing the packet loss retransmission NACK request message;

determine at least one target data packet corresponding to the at least one data packet ID, in which a timestamp corresponding to the target data packet is prior to the retransmission timestamp; and send the at least one target data packet to the first device.

It is noted that the preceding explanatory description of the data transmission control method is also applicable to the data transmission control apparatus of the embodiment and will not be repeated here.

In the embodiment, the retransmission timestamp sent by the first device is received after transmitting the first data packet to the first device, and the data transmission control is performed according to the retransmission timestamp. Since the retransmission timestamp is determined by the first device based on the network jitter degree value, it is possible to avoid the influence of network jitter and ensure an accuracy of retransmission control of the data packet.

To implement the above embodiments, the disclosure also provides an electronic device. The electronic device includes: a memory, a processor, and computer programs stored on the memory and runnable on the processor. When the programs are executed by the processor, the data transmission control method as proposed in the preceding embodiments of the disclosure is implemented.

To implement the above embodiments, the disclosure also provides a non-transitory computer readable storage medium having computer instructions stored thereon. When the computer instructions are executed by a processor, the data transmission control method as proposed in the preceding embodiments of the disclosure is implemented.

To implement the above embodiments, the disclosure also provides a computer program product having computer programs. When the computer programs are executed by a processor, the data transmission control method as proposed in the preceding embodiments of the disclosure is implemented.

To implement the above embodiments, the disclosure also provides a computer program including computer program codes. When the computer program codes are running on a computer, the computer is caused to implement the data transmission control method as proposed in the preceding embodiments of the disclosure.

Figure 9:
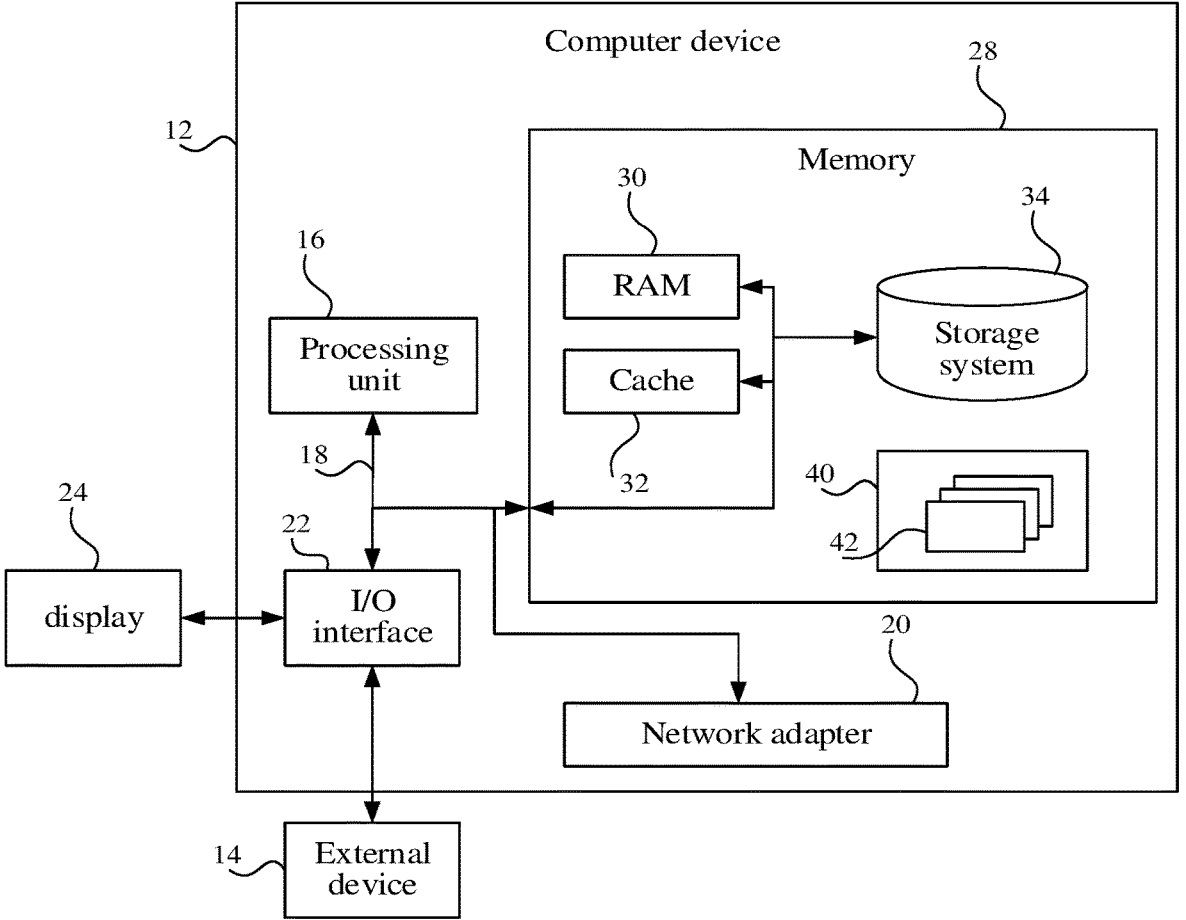
FIG. 9 is a block diagram of an exemplary electronic device suitable for implementing the embodiments of the disclosure.

FIG. 9 is a block diagram of an exemplary electronic device suitable for implementing the embodiments of the disclosure. The electronic device 12 shown in FIG. 9 is merely an example and should not impose any limitations on the functionality or scope of use of the embodiments of the disclosure.

As shown in FIG. 9, the electronic device 12 is represented in the form of a general computing device. Components of the electronic device 12 may include, but are not limited to, one or more processors or processing units 16, a system memory 28, and a bus 18 connecting different system components, including the system memory 28 and the processing units 16. The bus 18 represents one or more of several types of bus structures, including a memory bus or memory controller, a peripheral bus, a graphics acceleration port, a processor or a local area bus using any of the multiple bus architectures. For example, these architectures include, but are not limited to, the Industry Standard Architecture (ISA) bus, the Micro Channel Architecture (MAC) bus, the Enhanced ISA bus, the Video Electronics Standards Association (VESA) local area bus, and the Peripheral Component Interconnection (PCI) bus.

The electronic device 12 typically includes a variety of computer system readable mediums. These mediums may be any available medium that can be accessed by the electronic device 12, including volatile and non-volatile mediums, removable and non-removable mediums.

The memory 28 may include computer system readable mediums in the form of volatile memories, such as Random Access Memory (RAM) 30 and/or cache memory 32. The electronic device 12 may further include other removable/non-removable, volatile/non-volatile computer system storage mediums. By way of example only, the storage system 34 may be used to read and write non-removable, non-volatile magnetic mediums (not shown in FIG. 9, commonly referred to as "hard disk drives").

Although not shown in FIG. 9, disk drives for reading and writing removable non-volatile disks (e.g., "floppy disks"), and optical disk drives for reading and writing removable non-volatile optical disks (e.g., Compact Disc Read Only Memory (CD-ROM), and Digital Video Disc Read Only Memory (DVD-ROM), or other optical mediums). In these conditions, each drive may be connected to the bus 18 via one or more data media interfaces. The memory 28 may include at least one program product having a set (e.g., at least one set) of program modules that are configured to perform the functions of embodiments of the disclosure.

A program/utility 40 having a set of (at least one set of) program modules 42, which may be stored in, for example, the memory 28, such program modules 42 include, but are not limited to, an operating system, one or more applications, other program modules and program data. Each of these examples or some combination thereof may include an implementation of network environment. The program module 42 typically performs functions and/or methods in the embodiments described in this disclosure.

The electronic device 12 may also communicate with one or more external devices 14 (e.g., keyboard, pointing device, and display 24), one or more devices that enable the user to interact with the electronic device 12, and/or with any device (e.g., network card, and modem) that enables the electronic device 12 to communicate with one or more other computing devices. This communication may be via input/output (I/O) interface 22. Moreover, the electronic device 12 may also communicate with one or more networks (e.g., Local Area Network (LAN), Wide Area Network (WAN), and/or public networks, such as the Internet) through the network adapter 20. As shown, the network adapter 20 communicates with other modules of the electronic device 12 via the bus 18. It should be noted that although not shown in the figures, other hardware and/or software modules may be used in combination with the electronic device 12, including but not limited to: microcode, device drives, redundant processing units, external disk drive arrays, RAID systems, tape drives, and data backup storage systems.

The processing unit 16 performs various functional applications and data processing by running programs stored on the system memory 28, such as implementing the data transmission control method mentioned in the preceding embodiments.

According to the embodiments of the disclosure, the data transmission control method, the data transmission control apparatus, the electronic device, the computer readable storage medium, the computer program product, and the computer programs of the disclosure achieve at least the following beneficial effects.

The first data packet transmitted by the second device is received, the first time information corresponding to the first data packet is determined, and the network jitter degree value is determined based on the first time information and the second time information. The second time information is the time information corresponding to the second data packet, the second data packet is the data packet transmitted by the second device to the first device before transmitting the first data packet. The retransmission timestamp is determined based on the network jitter degree value and the retransmission timestamp is sent to the second device. Since retransmission control of the data packet can be performed with the assistance of the network jitter degree, the influence of network jitter can be avoided, which effectively improves a retransmission control efficiency of the data packet and a retransmission control effect of the data packet, thereby effectively improving a communication stability and a communication quality between devices.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

It should be noted that in the description of the disclosure, the terms "first" and "second" are used for descriptive purposes only and are not to be construed as indicating or implying relative importance. In addition, in the description of the disclosure, unless otherwise specified, "plurality" means two or more.

Any process or method described in a flowchart or described herein in other ways may be understood to include one or more modules, segments or portions of codes of executable instructions for achieving specific logical functions or steps in the process, and the scope of a preferred embodiment of the disclosure includes other implementations, which may perform functions not in the order shown or discussed, but in a substantially simultaneous manner or in the reverse order, depending on the functions involved, as should be understood by those skilled in the art to which the embodiments of the disclosure belong.

It should be understood that each part of the disclosure may be realized by the hardware, software, firmware or their combination. In the above embodiments, a plurality of steps or methods may be realized by the software or firmware stored on the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a Programmable Gate Array (PGA), a Field Programmable Gate Array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above can be ROMs, disks or CD-ROMs.

Reference throughout this specification to "an embodiment," "some embodiments," "an example," "a specific example," or "some examples," means that a particular feature, structure, material, or characteristic described in combination with the embodiment or example is included in at least one embodiment or example of the disclosure. The appearances of the above phrases in various places throughout this specification are not necessarily referring to the same embodiment or example of the disclosure. Furthermore, the particular features, structures, materials, or characteristics may be combined in any suitable manner in one or more embodiments or examples.

Although embodiments of disclosure have been shown and described above, it should be understood that above embodiments are just explanatory, and cannot be construed to limit the disclosure, for those skilled in the art, changes, alternatives, and modifications can be made to the embodiments without departing from spirit, principles and scope of the disclosure.

What is claimed is:

1. A data transmission control method, performed by a first device, wherein the first device receives a data packet transmitted by a second device, and the method comprises:
   receiving a first data packet transmitted by the second device, and determining first time information corresponding to the first data packet;
   determining a network jitter degree value based on the first time information and second time information, wherein the second time information is time information corresponding to a second data packet, and the second data packet is a data packet transmitted by the second device to the first device before transmitting the first data packet; and
   determining a retransmission timestamp based on the network jitter degree value, and sending the retransmission timestamp to the second device,
   wherein the determining the retransmission timestamp comprises:
      determining a target timestamp, wherein the target timestamp is a timestamp having a maximum value in a plurality of timestamps, and the plurality of timestamps comprise timestamps corresponding to a plurality of data packets received within a historical time period, respectively; and
      determining a target reception time corresponding to the target timestamp, a time sum of the target timestamp and the target reception time, and a difference between the time sum and the network jitter degree value as the retransmission timestamp.

2. The method of claim 1, wherein the determining the first time information corresponding to the first data packet comprises:
   determining a first reception time at which the first data packet is received;
   parsing a first timestamp corresponding to the first data packet;
   wherein the first timestamp is a timestamp when the second device transmits the first data packet, and the first reception time and the first timestamp are jointly configured as the first time information.

3. The method of claim 2, wherein the second time information comprises a second reception time and a second timestamp, wherein the second reception time is a time when the first device receives the second data packet, and the second timestamp is a timestamp when the second device transmits the second data packet, and wherein the determining the network jitter degree value based on the first time information and the second time information comprises determining the network jitter degree value based on the first reception time, the first timestamp, the second reception time, and the second timestamp.

4. The method of claim 3, wherein the determining the network jitter degree value based on the first reception time, the first timestamp, the second reception time, and the second timestamp comprises:
   determining a first difference between the first timestamp and the first reception time;
   determining a second difference between the second timestamp and the second reception time; and
   determining a difference between the second difference and the first difference as the network jitter degree value.

5. The method of claim 1, wherein the sending the retransmission timestamp to the second device comprises:
   generating a packet loss retransmission Negative Acknowledgement (NACK) request message based on the retransmission timestamp; and
   in response to a current time reaching a preset time, sending the packet loss retransmission NACK request message to the second device.

6. The method of claim 1, wherein the determining the network jitter degree value based on the first time information and the second time information, comprises inputting the first time information and the second time information into a pre-trained jitter detection model to obtain the network jitter degree value outputted by the pre-trained jitter detection model.

7. A data transmission control method, performed by a second device, wherein the second device transmits a data packet to a first device, and the method comprises:

receiving, after transmitting a first data packet to the first device, a retransmission timestamp sent by the first device, wherein the retransmission timestamp is determined by the first device based on a network jitter degree value; and performing data transmission control based on the retransmission timestamp, wherein the retransmission timestamp is determined by the first device based on a network jitter degree value by determining a target timestamp, wherein the target timestamp is a timestamp having a maximum value in a plurality of timestamps, and the plurality of timestamps comprise timestamps corresponding to a plurality of data packets received within a historical time period, respectively, and by determining a target reception time corresponding to the target timestamp, a time sum of the target timestamp and the target reception time, and a difference between the time sum and the network jitter degree value as the retransmission timestamp.

8. The method of claim 7, wherein the receiving the retransmission timestamp sent by the first device comprises:

receiving a packet loss retransmission Negative Acknowledgement (NACK) request message sent by the first device; and obtaining the retransmission timestamp by parsing the packet loss retransmission NACK request message.

9. The method of claim 8, wherein the performing the data transmission control based on the retransmission timestamp comprises:

obtaining at least one data packet identification (ID) that has been lost by parsing the packet loss retransmission NACK request message;

determining at least one target data packet corresponding to the at least one data packet ID, wherein a timestamp corresponding to the at least one target data packet is prior to the retransmission timestamp; and transmitting the at least one target data packet to the first device.

10. An electronic device, comprising:

at least one processor; and a memory communicatively coupled to the at least one processor; wherein the memory stores instructions executable by the at least one processor, when the instructions are executed by the at least one processor, the at least one processor is caused to implement a method comprising:

receiving a first data packet transmitted by a second device, and determining first time information corresponding to the first data packet;

determining a network jitter degree value based on the first time information and second time information, wherein the second time information is time information corresponding to a second data packet, and the second data packet is a data packet transmitted by the second device to a first device before transmitting the first data packet; and determining a retransmission timestamp based on the network jitter degree value, and sending the retransmission timestamp to the second device, wherein the determining the retransmission timestamp comprises:

determining a target timestamp, wherein the target timestamp is a timestamp having a maximum value in a plurality of timestamps, and the plurality of timestamps comprise timestamps corresponding to a plurality of data packets received within a historical time period, respectively; and determining a target reception time corresponding to the target timestamp, a time sum of the target timestamp and the target reception time, and a difference between the time sum and the network jitter degree value as the retransmission timestamp.

11. The device of claim 10, wherein the determining the first time information corresponding to the first data packet, comprises:

determining a first reception time at which the first data packet is received; and parsing a first timestamp corresponding to the first data packet;

wherein the first timestamp is a timestamp when the second device transmits the first data packet, and the first reception time and the first timestamp are jointly configured as the first time information.

12. The device of claim 11, wherein the second time information comprises a second reception time and a second timestamp, the second reception time is a time when the first device receives the second data packet, and the second timestamp is a timestamp when the second device transmits the second data packet, and wherein the determining the network jitter degree value based on the first time information and the second time information comprises determining the network jitter degree value based on the first reception time, the first timestamp, the second reception time, and the second timestamp.

13. The device of claim 12, wherein the determining the network jitter degree value based on the first reception time, the first timestamp, the second reception time, and the second timestamp comprises:

determining a first difference between the first timestamp and the first reception time;

determining a second difference between the second timestamp and the second reception time; and determining a difference between the second difference and the first difference as the network jitter degree value.

14. The device of claim 10, wherein the sending the retransmission timestamp to the second device comprises:

generating a packet loss retransmission Negative Acknowledgement (NACK) request message based on the retransmission timestamp; and in response to a current time reaching a preset time, sending the packet loss retransmission NACK request message to the second device.

15. The device of claim 10, wherein the determining the network jitter degree value based on the first time information and the second time information, comprises inputting the first time information and the second time information into a pre-trained jitter detection model, to obtain the network jitter degree value outputted by the pre-trained jitter detection model.

* * * * *